United States Patent

[11] 3,569,682

[72] Inventors James P. Tipton
Waynesboro;
Donald L. Logerwell, Alexandria, Va.
[21] Appl. No. 702,697
[22] Filed Feb. 2, 1968
[45] Patented Mar. 9, 1971
[73] Assignee General Electric Company

[54] MULTIPLE PATH NUMERICAL CONTROL SYSTEM
14 Claims, 7 Drawing Figs.

[52] U.S. Cl. ................................................. 235/151.11,
235/197, 318/18
[51] Int. Cl. ................................................. G05 11/26,
G05 19/36
[50] Field of Search ........................................ 235/151.11,
151.1, 151, 92; 318/18, 20; 340/172.5

[56] References Cited
UNITED STATES PATENTS
3,283,129 11/1966 Kelling ........................... 235/92
3,325,633 6/1967 Lukens II ....................... 235/151.11
3,390,315 6/1968 McDonough et al. .......... 235/151.11
3,439,346 4/1969 McGee .......................... 235/151.11

Primary Examiner—Malcolm A. Morrison
Assistant Examiner—Felix D. Gruber
Attorneys—Lawrence G Norris, Michael Masnik, Stanley C. Corwin, Frank L Neuhauser, Oscar B. Waddell and Melvin M. Goldenberg ABSTRACT: A control system is described for commanding motion of a machine movable member along two paths having a common axis in response to the generation of first and second feedrate signals indicative of the desired rate of travel of the machine along the two paths. First and second function generators convert the first and second feedrate signals into first and second command signals, each of which includes a component signal which commands motion of the machine movable member along the common axis. A gated reversible counter is connected to each of the function generators, the magnitude and direction of its count being indicative of the rates of generation of each of the common axis component command signals. A logic network is connected to the output of the gated reversible counter and to the inputs of the function generators and functions to stop the transmission of either of the feedrate signals in response to an output from the gated reversible counter indicative of a predetermined count therein.

PATENTED MAR 9 1971          3,569,682

INVENTOR.
JAMES P. TIPTON
DONALD L. LOGERWELL
BY
THEIR ATTORNEY

MULTIPLE PATH NUMERICAL CONTROL SYSTEM

BACKGROUND OF THE INVENTION

This invention relates to numerical control systems and, more particularly, to a numerical control system which enables a machine element to contour simultaneously two geometrically dissimilar paths.

Numerical control systems which command the movement of machine movable members include, basically, an electronic control portion and a servo or operating portion. Separate input equipment provides the first portion with numerical command information concerning, for example, the speed of movement of the machine or component, the distance and direction of movement, and the geometry of the path to be followed. The command information is transmitted to, within, and between the two portions by means of electrical pulses. Included within the electronic control portion are components which, in response to information from the external input equipment, act to modify pulses from a source such as a clock to provide a signal which is designated a velocity signal or a feedrate. This signal includes information which will determine the speed of travel of the machine along the path to be contoured.

Every path in space, however, may be resolved geometrically into three components, and it is thus necessary that the velocity signal or feedrate be likewise resolved into components. For the sake of simplicity, the examples shown hereinafter relate to paths confined to one plane thereby requiring resolution into components in that plane. The electronic control portion therefore also includes a function generator, the purpose of which is to resolve the velocity or feedrate into components such as a rectangular coordinate system, determined by the geometry of the path to be contoured. The output of each function generator is a sequence of recurrent pulses each representing an increment of movement, and known as command signals or pulses. The repetition or recurrence rate of said command signals or pulses is indicative of the desired velocity in the particular component direction and the total number of said signals or pulses which is indicative of the relative distance to be traveled. The command signals are transmitted to counters, the function of which is to provide electrical signals to the servo portion of the numerical control system. The function of that portion, briefly, is to transform the electrical signals from the electronic control portion into machine element movements while maintaining system stability. This invention, however, relates exclusively to the electronic control portion of numerical control systems.

While the prior art includes numerous machines adapted to contour a single path along a workpiece, situations arise which demand a machine capable of contouring simultaneously two or more paths and, more specifically, two or more paths which are geometrically dissimilar. Such a machine, for example, would comprise a carriage member having head members movably mounted thereon. The carriage member is adapted to move over a workpiece in a direction corresponding to what is designated a common axis, and the head members, which carry cutters or torches, for example, move along additional axes disposed at right angles to the common axis. Contouring is accomplished by the relative movement between the carriage along the common axis and the head members along the other axes.

The structure of the machine requires that the paths be simultaneously contoured. However, since the entire machine carriage moves along the common axis, the head members cannot move simultaneously at different rates in that direction. As a result, the control system must be provided with means for reconciling this physical requirement with the tendency of the control system arising from the geometry of the two paths to be contoured.

SUMMARY OF THE INVENTION

It is accordingly an object of the present invention to provide a control system for commanding a plurality of trajectories in space where movement in one direction is a common movement.

Another object of this invention is to provide a numerical control system which enables a machine element to contour simultaneously two or more geometrically dissimilar paths.

A further object of this invention is to provide such a control system whereby the requirement imposed on the system by the relatively different rates of change in the common axis of the paths to be contoured is reconciled with the requirement that the entire machine must move along the common axis.

Briefly stated, in accordance with one aspect of this invention, there is provided a control command system in which two signals each command motion of a machine element so as to enable it to contour simultaneously two geometrically dissimilar paths having a common axis. Each of the two command signals includes a component signal available for controlling motion of the machine along the common axis. The recurrence of these two component signals is monitored. When the recurrence rate of one exceeds that of the other by a predetermined amount, the generation of the signal occurring at the excessive rate is temporarily blocked thereby reducing its effective rate so as to be compatible with the signal occurring at the lower rate.

BRIEF DESCRIPTION OF THE DRAWINGS

An understanding of an embodiment of the invention and further objects and advantages of this invention can be obtained by referring to the following description taken in conjunction with the accompanying drawings, wherein.

DESCRIPTION OF THE INVENTION

Figure 1:
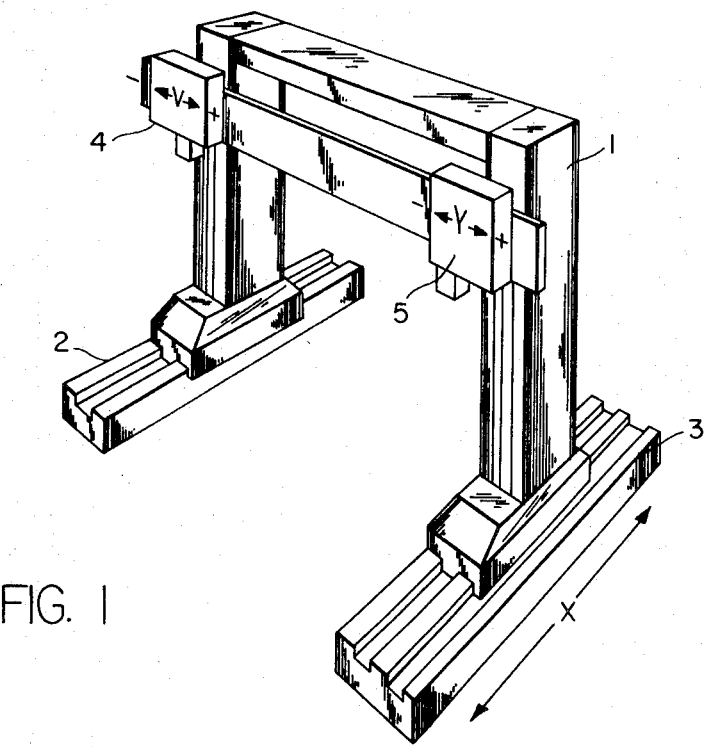
FIG. 1 is a generalized representation of a machine adapted to simultaneously contour two paths.

FIG. 1 is a generalized representation of a machine adapted to contour two geometrically dissimilar paths. A single carriage member 1 is movably mounted on two parallel rails 2 and 3, and movement of the carriage along the rails over a workpiece corresponds, by convention, to movement along an $X$ or common axis. Two head members 4,5 are positioned on the carriage and are adapted to move at right angles with respect to the direction of travel of the carriage 1 along respective axes designated, by convention, as the $V$ and $Y$ axes respectively. The head members 4,5 could carry, for example, torches, drafting pens or cutters. Two contours or paths will thus be described by the relative movement between the carriage member as it travels along the $X$ or common axis, and each of the head members traveling along the $V$ and $Y$ axes. For each of the two paths to be described, therefore, numerical information will be transmitted through the control system by electrical pulses commanding the rate and extent of movement along $X$, $V$ and $Y$ axes.

Figure 2A:
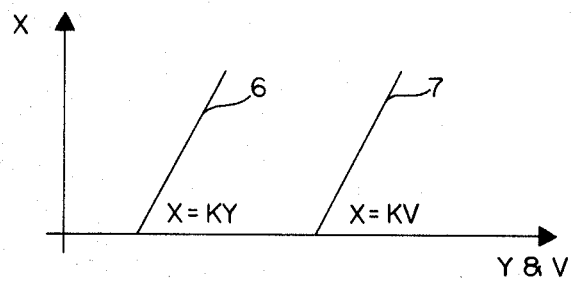
FIGS. 2a and 2b show two sets of paths which may be simultaneously contoured by the machine of FIG. 1.
Figure 2B:
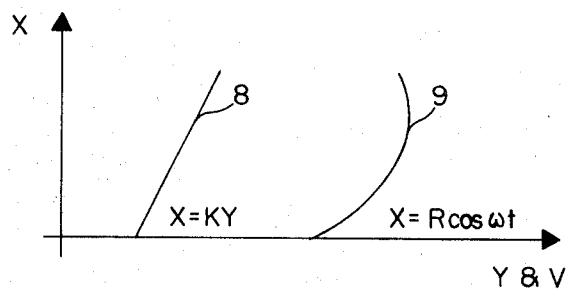

FIGS. 2a and 2b show two sets of paths which may be contoured by the machine. FIG. 2a shows two geometrically similar paths in the form of straight lines 6,7 having the same slopes and identical starting and finishing points in the coordinate systems. In contouring the two paths, the carriage travels along the X or common axis at a given velocity, and the two heads move at similar rates with respect to each other along the Y and V axes, respectively. What is important to note is that as the carriage moves along the common axis, the geometric similarity of the paths is compatible with the constant rate of movement in the X direction. This, in turn, is compatible with the physical requirement that the machine contour both paths simultaneously. It should be noted that the machine in following the similar paths, maintains the same separation between Y and V components of path movement.

It should be understood that the separation of endpoints of the two paths to be contoured may be different at the end than at the start of machine movement. The cutters in heads 4 and 5 may be lowered individually or indeed could be offset from each other. Thus the only restriction imposed by the machine is the need to control the simultaneous contouring of two or more dissimilar paths having a common axis of movement and which have the same separation of the starting and finishing points.

FIG. 2b shows two paths 8 and 9 which have the same starting and finishing points but which are geometrically dissimilar. The first path 8 may be mathematically described by the expression, $X = KY$, and the second, 9, may be mathematically described by the relationship, $X = \sqrt{R^2 - V^2}$, where R is the radius of the arc, $V = R \sin \omega t$, and $X = R \cos \omega t$. Along the first path the rate of travel or velocity in the X or common direction will be constant. Viewing the second path in conjunction with the first, it will be observed that along the initial portions of the second path, the rate of change in the X direction will be less than that along the first path. Midway along the second path, the rate of change in the X direction will approach that along the first path and in the region approaching the finishing point of the second path the rate of change in the X direction will exceed that along the first path. When two such dissimilar paths are to be contoured, the velocities of the two heads in the Y and V directions must at times be different, but the physical arrangement of the machine does not preclude different velocities in the Y and V directions. The two head members are independently movable along the separate Y and V axes subject to their common tie to control movement along the X axis, and the control signals can command different rates of movement of the heads along each path in the Y and V directions. The geometric dissimilarity of the two paths will also result in the control system attempting to command different rates of movement of the heads along each path in the X direction. Since the entire machine carriage moves along the X or common axis, however, the heads cannot move simultaneously at different rates in that direction.

Figure 3:
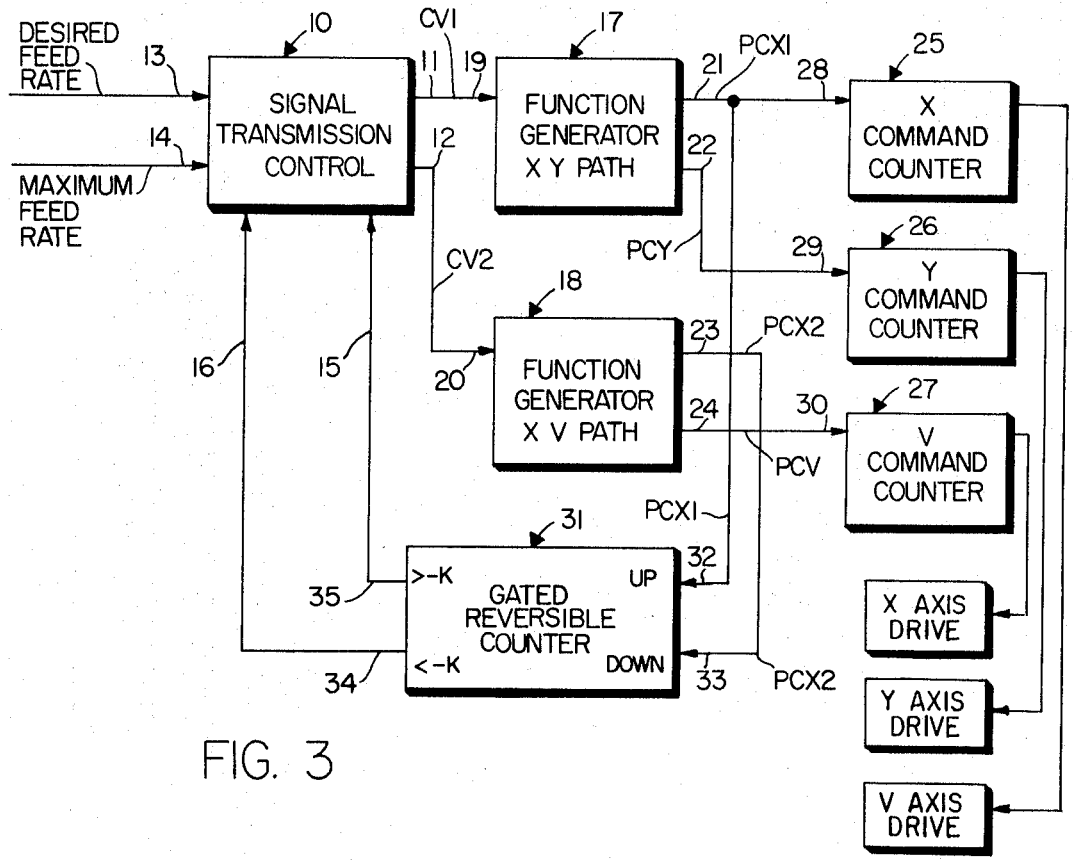
FIG. 3 is a block diagram of a control system incorporating this invention.

FIG. 3 is a block diagram of a system constructed in accordance with this invention to achieve the objectives stated. A signal transmission control 10 is provided for controlling the availability of two signals each of which is indicative of the desired rate of movement of the machine along the two paths. The transmission control has two output terminals 11, 12 and four input terminals 13—16. A signal, CV1, is available at output terminal 11 and is indicative of the desired rate of travel of the machine along the XY path. A signal, CV2, is likewise available at output terminal 12 and is indicative of the desired rate of travel of the machine along the XV path. A signal indicative of the desired feedrate for one of the paths, for example the rate of machine travel along the XY path, is applied at input terminal 13. It is contemplated that such a signal velocity could be generated as shown by G. B. Lukens II in FIG. 1 of U.S. Pat. No. 3,325,633, dated Jun. 13, 1967 and assigned to the assignee of the present invention. FIG. 1 of the Lukens II patent shows such a maximum feed rate signal as C2. The desired feedrate is obtained as a part of program preparation, not in the control system, and is determined by such factors as machine dynamics, part material, tooling, etc. A signal indicative of the maximum feedrate of the electronic system is applied at input terminal 14, the reason for which will be explained further on in the specification. It should be noted that the desired and maximum feedrates may correspond to either of the two paths as will be apparent from a further reading of the specification. It should also be noted that the signal input on lines 13 and 14 to control 10 could be one feedrate applied to both terminals.

The signal transmission control includes two additional input terminals 15 and 16 and is designed so that when a signal is applied to either of these input terminals, the output at one of the terminals, 11 or 12, will be blocked.

In order to convert the feedrate signals for each path into command signals for each component thereof, the system includes a function generator 17 for the XY path and a function generator 18 for the XV path. The feedrate signal CV1 for the path in the XY plane, available at output terminal 11 of the signal transmission control, is applied to an input terminal 19 of function generator 17 and the feedrate signal CV2 for the path in the XV plane, available at output terminal 12 of the transmission control, is applied to an input terminal 20 of function generator 18. Each of the function generators has two outputs, the signals at which are a motion command signal for each of the components of the path. In particular, the signal PCX1 at output terminal 21 of function generator 17 commands motion along the X component of the XY path and the signal PCY at output terminal 22 of the same function generator commands motion along the Y component of the same path. Similarly, there is available at output terminal 23 of function generator 18 a signal PCX2 which indicates commanded motion along the X component of the XV path, and signal PCV is available at output terminal 24 of that function generator to command motion along the V component of the same path. It is contemplated that function generators similar to those disclosed by L. U. C. Kelling in U.S. Pat. No. 3,283,129, dated Nov. 1, 1966 and assigned to the assignee of the present invention would be usable in this system.

In order to transmit the output signals of the function generators to the servo portion of the control system there are provided X, Y, and V command counters 25, 26, 27, respectively. These command counters are similar to the command phase counters disclosed by L. U. C. Kelling in U.S. Pat. No. 3,226,649 dated Dec. 28, 1965 and assigned to the common assignee.

The X command signal, PCX1, obtained from function generator 17 is applied to input terminal 28 of X command counter 25. The Y command signal, PCY, obtained from function generator 17 is applied to input terminal 29 of Y command counter 26 and, similarly, the V command signal, PCV, obtained from function generator 18 is applied to input terminal 30 of V command counter 27. Since the feedrate along the X or common axis is generated by both function generators, it is necessary to apply the X output of only one of the function generators to the X command counter.

It should be noted that for purposes of simplicity, only the output of the function generators is shown supplied to the command counters. It should be noted in referring to the aforementioned U.S. Pat. No. 3,226,649 that the command counters respond to clock pulses and a directional control signal to count in a normal manner. The command counters however respond to the application of the function generator output to modify this normal counting rate to produce the desired path control.

In order to compare and determine any difference in the rate at which both function generators produce a signal commanding motion along the X or common axis and determine which is the higher and which is the lower rate, there is provided, in accordance with this invention, monitoring means comprising a gated reversible counter 31 having first and second input terminals 32 and 33, respectively. When pulses are received at the first input terminal 32, the counter counts up. The common axis command signal from function generator 17, i.e., PCX1 is applied to this input terminal. When pulses are received at the second input terminal 33 of the counter 31, the counter counts down. The common axis command signal from function generator 18, i.e., PCX2, is applied to this input terminal. The gated reversible counter is also provided with two output terminals 34,35 and is designed so that a signal will appear at output terminal 35 if the counter has been caused to count up beyond a predetermined limit, designated +K, and so that a signal will appear at output terminal 34 if the counter counts down below a predetermined limit, designated −K. Output terminal 34 is connected to input terminal 16 on the transmission control 10, and the transmission of a signal thereto results in blocking the output of signal CV2 resulting in the stoppage of function generator 18. Likewise, output terminal 35 of the counter 31 is connected to input terminal 15 on the transmission control 10 and the transmission of a signal thereto will result in blocking the output of signal CV1 resulting in the stoppage of function generator 17.

In operation, the desired feedrate for one of the two paths is determined as a part of the program preparation. It has been found to be advantageous to supply the logic for the other of the two paths with a maximum feedrate to thereby provide the capability for the control to compute movement along the second path such that the common axis component of movement of the two paths is equal. This is done because if the feedrate is determined for one path it will thereby be automatically determined for the other path. Assuming that the desired feedrate has been determined for the XY path, the signal transmission control 10 will provide the CV1 signal at the desired feedrate and the CV2 signal at the maximum feedrate. The function generators 17 and 18 upon receiving these signals will calculate the two paths independently, each generator computing the path for its two axes by producing output pulses corresponding to one increment of machine motion for each of the axes.

Pulses for commanding motion along the X or common axis will be generated by both function generators. The pulses PCX1 from function generator 17, which command motion along the X axis, are applied to the X command counter 25 and at the same time to input terminal 32 of the gated reversible counter 31. The singular application of these pulses to the gated reversible counter causes it to count up. The X command pulses, PCX2, generated by function generator 18 are applied to input terminal 33 of the gated reversible counter 31 and will similarly cause it to count down. When PCX1 and PCX2 are generated at the same rate, no net count results in the gated reversible counter. This condition corresponds geometrically to the region of both paths where the rate of movement along the X or common axis is the same. If the PCX2 pulses occur at a higher rate than the PCX1 pulses, the net effect will be to cause the gated reversible counter to count down. This corresponds geometrically to the region along the path the rate of travel in the X or common direction is greater than that of the first path. If the counter counts down beyond a predetermined limit, −K, an output occurs at terminal 34 of the counter which countdown transmitted to input terminal 16 on the signal transmission control 10. The occurrence of the signal thereon prevents the CV2 signals from being available at terminal 12 of the transmission control 10 and hence countdown stops the operation of function generator 18. This, of course, stops the generation of the pulses PCX2. Calculations continue, however, in function generator 17 until it causes the counter 31 to count up beyond the limit, −K, at which time the CV2 pulses are no longer blocked and calculation resumes in function generator 18.

If, on the other hand, the PCX1 pulses occur at a higher rate than the PCX2 pulses, the gated reversible counter 31 will count up to the limit +K. A signal will appear on output terminal 35 of the counter and will be transmitted to input terminal 15 of the signal transmission control so as to result in stoppage of the CV1 pulses. The relatively more rapid occurrence of the PCX1 pulses corresponds tot to the region along the first path where the velocity in the direction of the common axis is greater than that of the second path. Since the function generator 18 in this particular example is computing at the maximum rate, however, the PCX2 pulses will normally occur at a higher rate than the PCX1 pulses so as to allow function generator 17 to compute uninterrupted and therefore generate the XY path at the desired rate.

Figure 4:
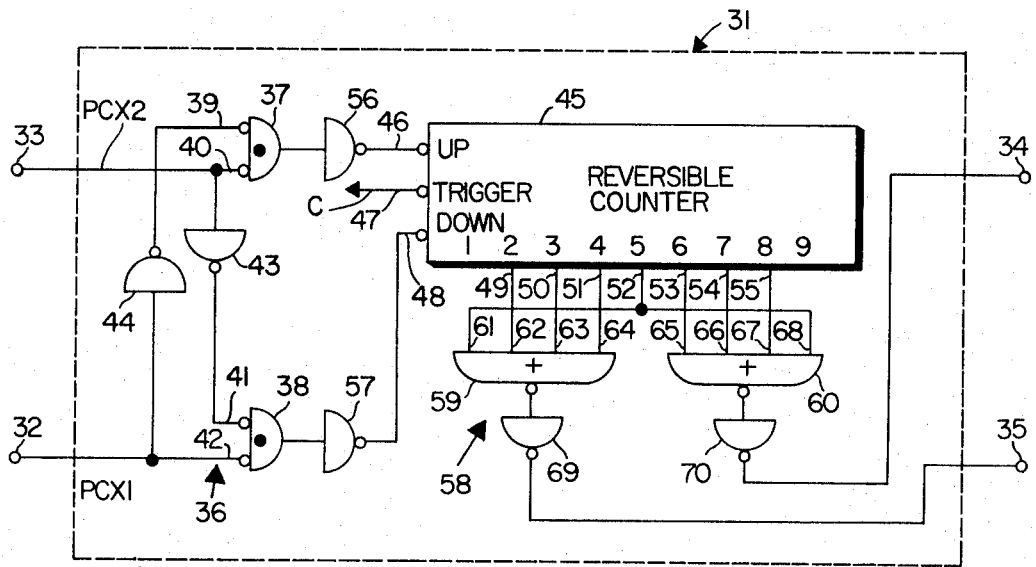
FIG. 4 is the logic diagram of a specific embodiment of the monitoring means included in the control system of FIG. 3.

FIG. 4 illustrates a specific embodiment of the monitoring means or gated reversible counter 31 which may be included in the system incorporating the invention. As shown in FIG. 3, the gated reversible counter is provided with a first input terminal 32 at which the command pulse, PCX1 is received from function generator 17, and a second input terminal 33 at which command pulse PCX2 is received from function generator 18. Referring to FIG. 4, the gated reversible counter includes a first decision logic network 36 comprising first and second NOR logic gates 37 and 38, respectively. Each of these gates is provided with two input terminals and one output terminal and function, as is well known in the art, to provide a logic 1 output in response to the simultaneous appearance of a logic 0 input at both input terminals. The diagram indicates this logic by the placement of the small circle at each input signifying a zero. If a logic 1 appears at either of the input terminals, the gate will provide a logic 0 output. Input terminal 42 of NOR gate 38 is connected to input terminal 32 of the gated reversible counter and input terminal 40 of NOR gate 37 is connected to input terminal 33 of the gated reversible counter. Input terminal 33 of the gated reversible counter is also connected to a first inverter 43, the output of which is connected to input terminal 41 of the NOR gate 38. Likewise, the input terminal 32 of the gated reversible counter is also connected to the input of a second inverter 44, the output of which is connected to input terminal 40 of the NOR gate 37.

Thus, the presence of command pulse PCX1 at input terminal 32 will result in the occurrence of a logic 1 input at terminal 42 of NOR gate 38 and a logic zero input on terminal 39 of NOR gate 37. The absence of command pulse PCX1, on the other hand, will result in a logic 0 input occurring at terminal 42 of NOR gate 38 and a logic 1 input occurring at terminal 39 of NOR gate 37. Similarly, the presence of command pulse PCX2 at the input terminal 33 will result in a logic 1 input at terminal 40 of NOR gate 37 and a logic 0 at input terminal 41 of NOR gate 38. The absence of command pulse PCX2, on the other hand, results in a logic 0 occurring at input terminal 40 of NOR gate 37 and a logic 1 at input terminal 41 of NOR gate 38.

Within the gated reversible counter 31 there is also included a reversible counter 45 provided with first, second, and third input terminals 46—48, respectively and a plurality of output terminals. Such a counter is well known in the art and adapted to count up in response to a steering pulse, in this particular example of a logic 0 pulse, being applied at input terminal 46 at a time preceding the occurrence of a trigger pulse C at input terminal 47. Similarly, the counter 45 is adapted to countdown in response to the occurrence of a steering pulse at input terminal 48 at a time preceding the occurrence of a trigger pulse at input terminal 47. The total count in the counter at a given time is indicated by the occurrence of an output on one of the particular output terminals. In this specific example, output terminals 49—55 correspond to the particular counts 2—8, respectively. The trigger input is obtained from a source of clock pulses which is a reference source of pulses for the operation of the many other components of the entire control system. The output of NOR gate 37 is connected to the input of an inverter 56, the output of which is connected to the input terminal 46 of the reversible counter 45 and, likewise, the output of NOR gate 38 is connected through an inverter 57 to input terminal 48 of the reversible counter 45.

A second decision logic network 58 is also provided and comprises first and second NOR gates, 59 and 60, each having four input terminals and one output terminal. Input terminals 62, 63, 64 and 61 of NOR gate 59 are connected to the counter output terminals 49, 50, 51 and 52, respectively, and input terminals 65, 66, 67 and 68 of NOR gate 60 are connected to output terminals 53, 54, 55 and 52, respectively of the reversible counter. NOR gate 59 will provide a logic 0 output when the counter 45 has counted up to any of the numbers 2—5 and NOR gate 60 will provide a logic 0 output when the counter has counted down to any of the numbers 8—5. The output of NOR gate 59 is connected through an inverter 69 to the output terminal 35, and the output of NOR gate 60 is connected through an inverter 70 to the output terminal 34.

Figure 5:
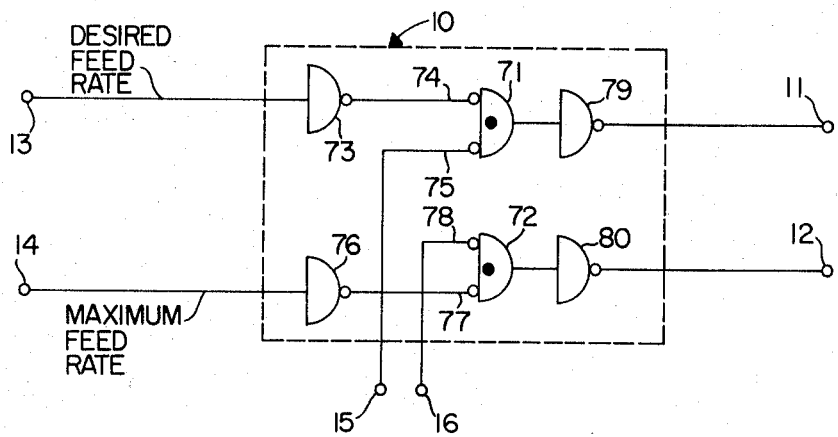
FIG. 5 is the logic diagram of a specific embodiment of the signal transmission control included in the control system of FIG. 3.

FIG. 5 shows a specific embodiment of the signal transmission control 10 included in the system incorporating this invention. The desired feedrate is applied to the first input terminal 13, the maximum feedrate signal is applied to the second input terminal 14, and the third and fourth input terminals 15 and 16 are connected to the output terminals 35 and 34, respectively, of the gated reversible counter 31. Included within the signal transmission control are first and second NOR gates 71 and 72, respectively. Like those included in the embodiment shown in FIG. 4, each is adapted to provide a logic 1 output in response to the logic 0 signals appearing simultaneously at each of its inputs. The desired feedrate is applied through an inverter 73 to input terminal 74 of NOR gate 71 and the other input terminal 75 of the NOR gate is connected to input terminal 15 which receives a signal from the gated reversible counter. The maximum feedrate signal, in this particular example, is applied through an inverter 76 to input terminal 77 of NOR gate 72, the other input terminal 78 of which is connected to input terminal 16 which receives a signal from the gated reversible counter. Thus, NOR gate 71 will provide a logic 1 output in response to the occurrence of the desired calculation rate signal at input terminal 13 of the signal transmission control and tot to the absence of a signal on input terminal 15 connected to the gated reversible counter. Likewise, NOR gate 72 will provide a logic 1 output in response to the occurrence of the maximum feedrate on input terminal 14 and to the absence of a signal on input terminal 16. The output of NOR gate 71 is connected through an inverter 79 to output terminal 11 of the signal transmission control and, similarly, the output of NOR gate 72 is connected through an inverter 80 to output terminal 12.

Figure 6:
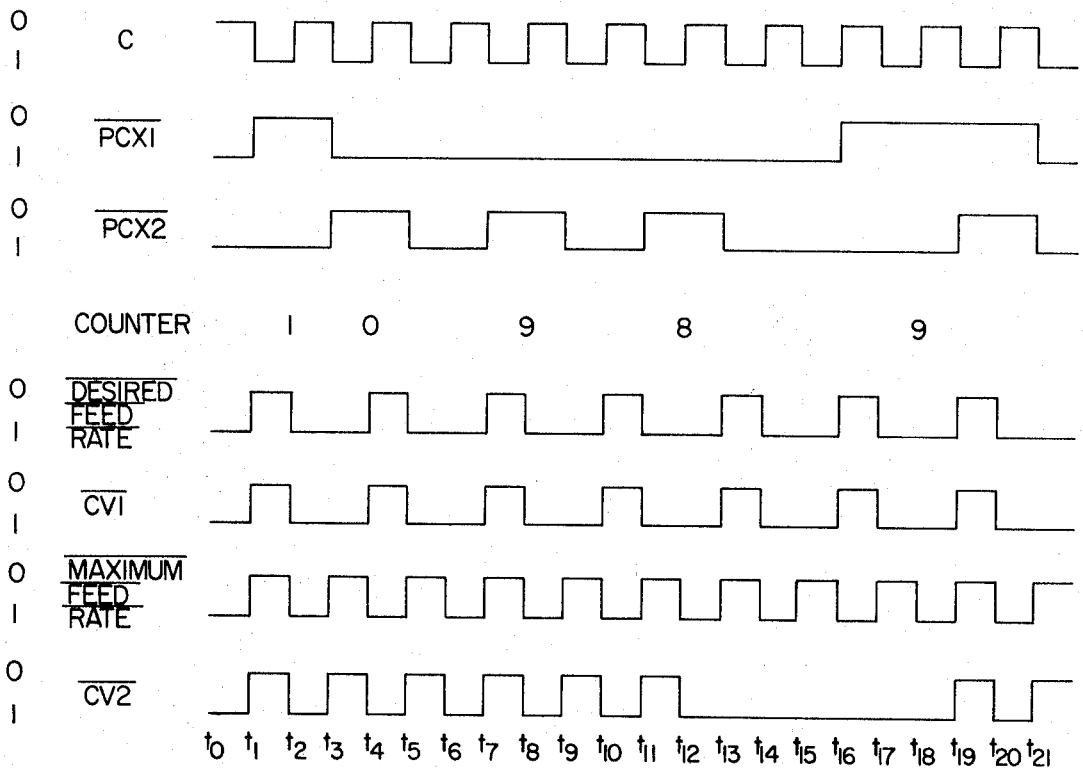
FIG. 6 illustrates waveforms occurring at various points in the embodiments shown in FIGS. 4 and 5.

The operation of the gated reversible counter and the signal transmission control may be more readily understood by referring to the voltage waveforms illustrated in FIG. 6. The first waveform represents the clock signal, C, which regularly alternates between the logic 1 and logic 0 states through time intervals which are utilized as a reference for the other waveforms. It should be noted at the outset that in this particular illustration the system operates on what is known in the art as negative logic and, therefore, that the clock pulse, C, which is applied to the trigger input of the reversible counter, is effective only when going to the logic 0 state. The next two waveforms shown in FIG. 6 are those for the two common axis command pulses $\overline{PCX1}$ and $\overline{PCX2}$ which, because of the negative logic utilized, are illustrated as PCX1 and PCX2. The numerical state of the counter is shown next followed by a waveform representing the desired calculation rate. Next, the waveform indicative of the output of the signal transmission control 10 is shown and designated as $\overline{CV1}$ because of the negative logic and is followed thereunder by the waveform illustrative of the maximum feedrate. This occurs, it will be observed, at a rate approximately twice that of the desired rate in this example. Finally, the waveform representative of the second output of the signal transmission control is shown and designated as $\overline{CV2}$.

Referring back to the upper portion of FIG. 6, during the interval from $t_0$ to $t_1$, $\overline{PCX1}$ and $\overline{PCX2}$ are both in the logic 1 state which means that the pulses PCX1 and PCX2 are in the logic 0 state and hence are not present. A logic zero 0 input is applied to input terminal 40 of NOR gate 37 and, likewise, a logic 0 input is applied to input terminal 42 of NOR gate 38 so as to result in a logic 1 input to both the countup and countdown terminals of the reversible counter. Thus, during this interval of time no count occurs. Therefore, no output is provided by the gated reversible counter for blocking the transmission of the desired feedrate or the maximum feedrate signals. During the interval of time from $t_1$ to $t_2$, $\overline{PCX1}$ changes from the logic 1 to the logic 0 state, meaning that $\overline{PCX1}$ is now present, while $\overline{PCX2}$ remains in the logic 1 state. This provides logic 0 inputs to NOR gate 37 resulting in a logic 0 input at terminal 46 of the counter 45. Since $\overline{PCX2}$ is still in the logic 1 state, the output of NOR gate 38 will be a logic 0 and a logic 1 will therefore be applied to terminal 48 of the counter. Thus, because the counter also operates in the negative logic mode, the conditions for a net up-count are partially satisfied; the net count of one will not appear, however, until the beginning of the time interval $t_2$ to $t_3$ when the trigger pulse C goes to the logic 0 state as shown in FIG. 6. During this interval, a signal will appear at the counter output terminal corresponding to a count of one, but since it is not connected to either of the NOR gates 69, 70, no signal will be sent to signal transmission control 10. Thus, the command pulses CV1 and CV2 will continue to occur at their regular rate as can be seen in the lower portion of FIG. 6.

At $t_3$, signal $\overline{PCX1}$ undergoes a transition from the logic 0 to the logic 1 state and $\overline{PCX2}$ simultaneously changes from the logic 1 to logic 0 state. $\overline{PCX1}$ in the logic 1 state is the same as PCX1 in the logic 0 state and with $\overline{PCX2}$ also in the logic 0 state the output of NOR gate 38 will be a logic 1 which provides a logic 0 at terminal 48 of the reversible counter. With $\overline{PCX1}$ in the logic 1 state, the terminal 46 receives a logic 1 input. A net count-down will then occur when the trigger pulse C returns to the logic 0 state at time $t_4$. At this point, counter 45 counts down to zone zero. From time $t_5$ to time $t_7$ both $\overline{PCX1}$ and $\overline{PCX2}$ are in the logic 1 state as they were during the interval of time $t_0$ to $t_1$ so that no net con count occurs in the counter, At time $t_7$, $\overline{PCX2}$ returns to the logic 0 state while $\overline{PCX1}$ remains in the logic 1 state and this results in a logic 1 output at NOR gate 38 and a logic 0 output at NOR gate 37. A net count-down to nine will occur at time $t_8$ when the clock pulse C goes to the 0 state. The output terminal of the counter corresponding to a count of nine is not connected to either of the NOR gates 69, 70, and thus the desired feedrate and the maximum feedrate are continued to be transmitted to the function generators as indicated by the continued regular occurrence of CV1 and CV2.

At time $t_{11}$, $\overline{PCX2}$ returns to the logic 0 state after being in the logic 1 and $\overline{PCX1}$ remains in the logic 1 state. At time $t_{12}$, the counter 45 will thus count down one additional unit, to 8. An output will occur at terminal 55 of the counter causing NOR gate 60 to provide an output which is transmitted through inverter 70 to provide a logic 1 input on terminal 16 of the signal transmission control 10 and an input terminal 78 of NOR gate 72 included therein. The logic 1 input to NOR gate 72 results in no further transmission of the maximum feedrate. This can be seen in the lower portion of the diagram, beginning at $t_{12}$, where the $\overline{CV2}$ signal remains in the logiz 1 state for a period of more than one clock pulse duration.

During the period $t_{13}$ to $t_{16}$, $\overline{PCX1}$ and $\overline{PCX2}$ are both in the logic 1 state, no net count occurs in the counter, and the signal $\overline{CV2}$ continues to remain in the logic 1 state indicating the absence of CV2. At time $t_{16}$, $\overline{PCX1}$ goes to the logic 0 state, $\overline{PCX2}$ remains in the logic 1 state with the result that the conditions for a net count-up are partially satisfied. This count cannot occur until time $t_{18}$, however, because the steering pulses do not precede the trigger pulse until that time. At time $t_{18}$, the count is thus 9 with the result that no output is applied to either of the NOR gates 69, 70. Thus, the signal $\overline{CV2}$ may resume its normal repetition rate. $\overline{CV2}$ undergoes a transition from logic 1 to logic 0 at time $t_{19}$ when the maximum feedrate also undergoes a similar transition. At $t_{19}$, $\overline{PCX2}$ also undergoes a transition to the logic 0 state, but because $\overline{PCX1}$ remains in logic 0 state state no net count occurs in the counter.

From the foregoing discussion it can be seen that when the PCX1 and PCX2 are in the same logic state, no net count occurs in the counter and the feedrate signals CV1 and CV2 continue to be generated at the designated rates. When the PCX1 and PCX2 signals remain at different counting rates for a time long enough to produce a net countdown to eight or up to two, the generation of the appropriate one of the feedrate signals, CV1 or CV2, will be blocked. Generation of the blocked feedrate signal will be continued at a later time when the net count changes so as to no longer be in the designated range.

The invention has been described by means of a specific embodiment. This should not be taken as a limitation since there are many readily apparent variations which come within the scope and spirit of the invention. Basically, the invention is a control for commanding trajectories in space where movement in one direction is a common movement for all trajectories. For example, the invention is not restricted to two paths; any number of paths can be simultaneously controlled. The trajectory whose rate of movement along the common axis is the slowest will control and limit the movement of all trajectories to this rate in the common direction. Where more paths than two are to be controlled, the system shown in FIG. 3 of the drawings would be modified by the addition of a function generator and a gated reversible counter for each extra path to be controlled.

The invention is not limited to paths defined within a plane. The movement controlled can have any number of axes of motion, the only requirement being that one axis of motion is common to all the paths. In FIG. 3 of the drawings, the function generators provided would be capable of commanding motion along each axis of the paths being contoured. Additional command counters as required would also be provided. In addition to 3-dimensioned paths the tool's attitude could be changed or the workpiece could be rotated or have its own axis of motion.

While cutting tools are described, the scope of the invention extends to any paths for any purpose where the movement along one axis is a common movement. While FIG. 3 shows a desired feedrate signal and a maximum feedrate signal being supplied to the function generators through the signal transmission control 10, it is to be understood that one common feedrate signal could supply each function generator and that the teaching of FIG. 3 is only a preferred example for certain applications.

Thus, while the invention has been described with reference to a numerical control system where particular NOR gate logic provides the control of the two paths contoured in the single plane of a workpiece, it is to be understood that neither numerical information, NOR gate logic, a machine tool environment, two paths nor one plane are features which limit the invention. It is therefore intended that the invention is only to be limited by the scope of the the appended claims.

We claim:

1. A control system for commanding movement of elements moving along geometrically dissimilar paths defined by different axes of movement and where one axis of movement is common to all of said paths, said control system comprising:
    means for providing command signals for commanding movement along each axis of each of said paths;
    means for comparing the command signals commanding movement along said common axis for all of said paths; and
    control means responsive to the result of the comparison for conforming said command signals commanding movement along said common axis to command signals commanding one common movement along said common axis for each of said paths.

2. A control system as recited in claim 1 wherein said means for providing command signals for commanding movement includes a function generator for each path, each function generator producing signals establishing a rate of movement command for each axis of movement.

3. A control system as recited in claim 2 wherein said means for comparing the command signals comprises monitoring means connected to said function generators to detect the difference in the signals representing rates of movement commanded along said common axis.

4. A control system as recited in claim 3 wherein said monitoring means produces an output whenever the difference in the signals representing rates of commanded common movement exceeds a predetermined minimum, said control means being responsive to said output.

5. A control system as recited in claim 4 wherein the output of said monitoring means indicates which common axis commanded movement is the slowest, and said control means inhibits the function generators for the other paths to conform the command signals commanding movement along the common axis to this slowest rate.

6. A control system as recited in claim 5 wherein said function generators are supplied with feedrate signals indicative of rate of movement along each path, and the output of each function generator is a pulse train for each axis of motion, the pulse rate of each train representing the rate command for motion with respect to the associated axis.

7. A control system as recited in claim 6 wherein said monitoring means is a gated reversible counter for each pair of paths being controlled:
    said counter counting up in response to pulses for the common axis of motion from one function generator of a pair and counting down in response to pulses for the common axis of motion from the other function generator of that pair; and
    said control means inhibiting said one function generator when said count is up beyond a predetermined limit and inhibiting said other function generator when said count is down below a predetermined limit.

8. A control system as recited in claim 7 wherein said means for providing command signals commanding movement further includes a command counter for each axis of movement for each path except the common axis of movement and one common command counter for all paths for said common axis of movement, each command counter being responsive to the pulse train from the associated function generator for the corresponding axis of movement, and said command counter for said common movement being responsive to the pulse train for said common movement from a selected one of said function generators.

9. A control system as recited in claim 8 wherein one of said function generators is selected as the master function generator and supplied with a feedrate signal indicative of the desired rate of movement along a master path, the other of said function generators being supplied with feedrate signals of a faster rate than said desired rate, and the command counter for said common movement is connected to said master function generator, such that counts of said gated reversible counter will serve to inhibit the other function generators and permit the command counter for said common movement to operate at said desired rate.

10. A control system as recited in claim 9 wherein said control system controls a machine tool, said elements being the tool elements, said paths being the contours formed by said tools on a workpiece, and said tools being restrained by said machine to one common movement with respect to a given axis.

11. A control system as recited in claim 6 wherein said control means is a transmission gate connecting said feedrate signals to said function generators, said transmission gate preventing said feedrate signals from being applied to appropriate ones of said function generators in response to the output of said monitoring means.

12. A control system as recited in claim 11 wherein said transmission gate comprises:
    a NOR gate, a first inverter and a second inverter for each path of movement being controlled;
    said NOR gate having two inputs, one connected to said first inverter to receive the feedrate signal and the other connected to receive the output of said monitoring means; and
    said second inverter connecting the output of said NOR gate to the appropriate function generator.

13. A control system as recited in claim 7 wherein said gated reversible counter comprises:
    a reversible counter;

a first logic circuit connecting the common movement commands from a pair of function generators to the input of said reversible counter;

a second logic circuit connecting the output of said reversible counter to said control means;

said first logic circuit comprising a conduction logic path for each of said common movement commands, each logic path including a NOR gate and first and second inverters; and said NOR gate having two inputs, one input connected to receive the common movement pulses from one function generator of said pair, and the other input connected to said first inverter to receive inverted pulses from the other function generator.

14. A control system as recited in claim 13 wherein said second logic circuit includes first and second NOR gates connected to receive the output count of said reversible counter:

said first NOR gate being responsive to counts less than a preselected number;

said second NOR gate being responsive to counts greater than a preselected number; and said first and second NOR gates being connected to said control means to supply the necessary input control signals thereto.

UNITED STATES PATENT OFFICE
CERTIFICATE OF CORRECTION

Patent No. 3,569,682          Dated March 9, 1971

Inventor(s) James P. Tipton and Donald L. Logerwell

It is certified that error appears in the above-identified patent and that said Letters Patent are hereby corrected as shown below:

Column 2, line 18, after "two" insert -- command --; line 23, after "recurrence" insert -- rate --. Column 5, l 51, after "the"(first occurrence) insert -- second --; afte "path" insert -- where --; line 54, after "which" delete -- countdown -- and insert -- is --; line 58, delete "countdow line 70, delete "tot". Column 6, line 48, delete "of". Co 7, line 27, delete "tot"; line 50, correct "$\overline{PCX1}$" and $\overline{PCX2}$" read -- PCX1 and PCX2 --; line 51, correct "PCX1 and PCX2" read -- $\overline{PCX1}$ and $\overline{PCX2}$ --. Column 8, line 27, after "net" delete -- con --; line 49, correct "logiz" to -- logic --.

Signed and sealed this 13th day of June 1972.

(SEAL)
Attest:

EDWARD M. FLETCHER, JR.          ROBERT GOTTSCHALK
Attesting Officer                Commissioner of Pater